US012162479B2

(12) United States Patent
Mizoguchi

(10) Patent No.: US 12,162,479 B2
(45) Date of Patent: Dec. 10, 2024

(54) DRIVING ASSISTANCE APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 259 days.

(21) Appl. No.: 17/745,004

(22) Filed: May 16, 2022

(65) Prior Publication Data

US 2022/0402484 A1    Dec. 22, 2022

(30) Foreign Application Priority Data

Jun. 22, 2021   (JP) ................................. 2021-103321

(51) Int. Cl.
*B60W 30/09*    (2012.01)
(52) U.S. Cl.
CPC ......... *B60W 30/09* (2013.01); *B60W 2552/10* (2020.02); *B60W 2720/106* (2013.01)
(58) Field of Classification Search
None
See application file for complete search history.

(56) References Cited

U.S. PATENT DOCUMENTS

2020/0290606 A1* 9/2020 Watanabe ......... B60W 60/0015
2022/0355821 A1* 11/2022 Ling ................. B60W 60/0015

FOREIGN PATENT DOCUMENTS

JP    2010-079425 A    4/2010
JP    2019-212095 A    12/2019

* cited by examiner

*Primary Examiner* — Tamara L Weber
(74) *Attorney, Agent, or Firm* — Rimon P.C.

(57) ABSTRACT

A driving assistance apparatus includes a driving environment information obtaining unit obtaining driving environment information ahead of a vehicle, a target object recognizer recognizing a target object based on the driving environment information, an object detection area setter setting an object detection area ahead of the vehicle, and a driving control arithmetic unit controlling a driving state of the vehicle when the target object is detected in the object detection area. The object detection area setter includes a stop area setter that sets a stop area, and a deceleration area setter that sets left and right deceleration areas. The driving control arithmetic unit includes a stop controller that controls the vehicle to stop when the target object is detected in the stop area, and a deceleration controller that controls the vehicle to decelerate when the target object is detected in at least one of the left and right deceleration areas.

12 Claims, 16 Drawing Sheets

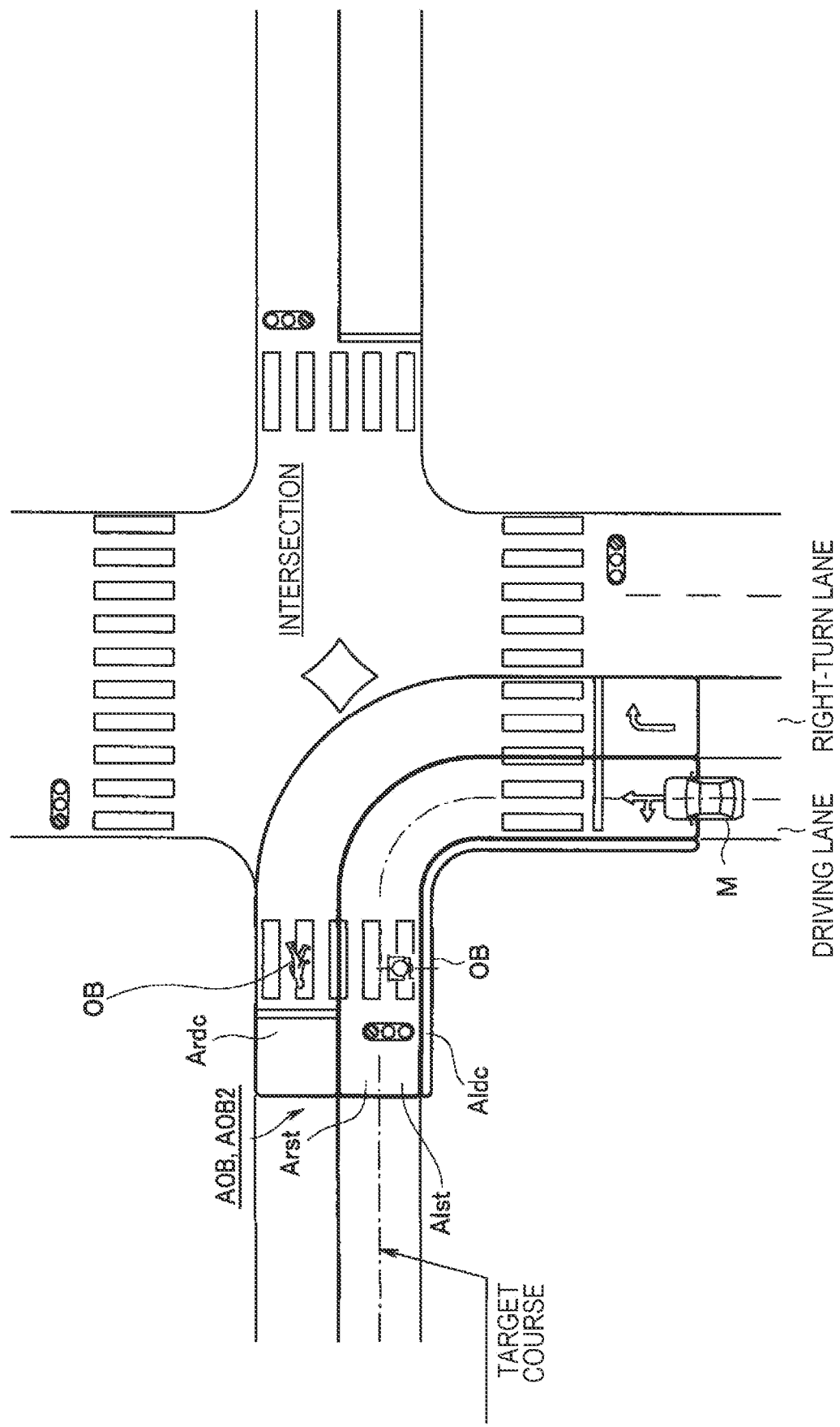

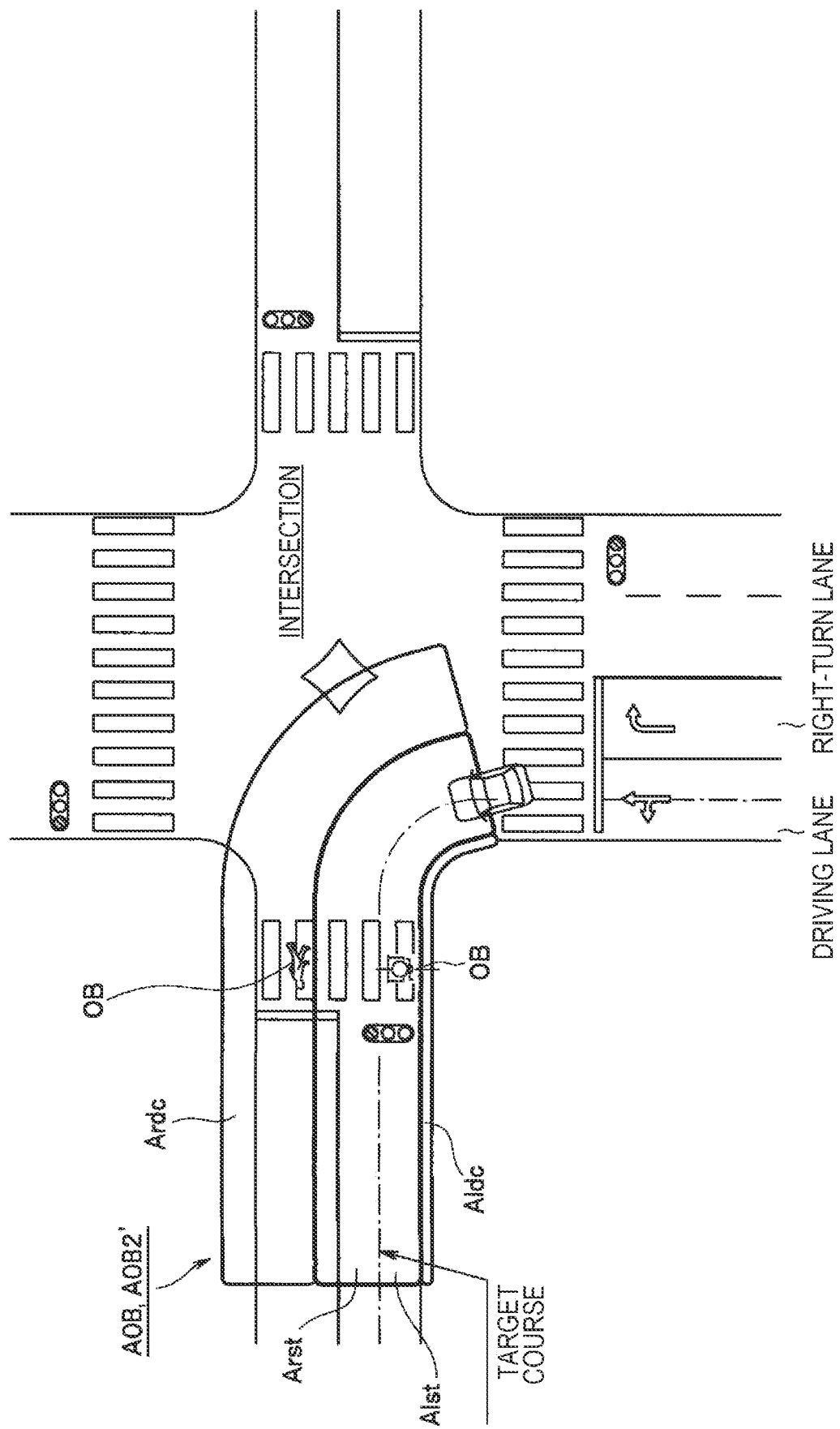

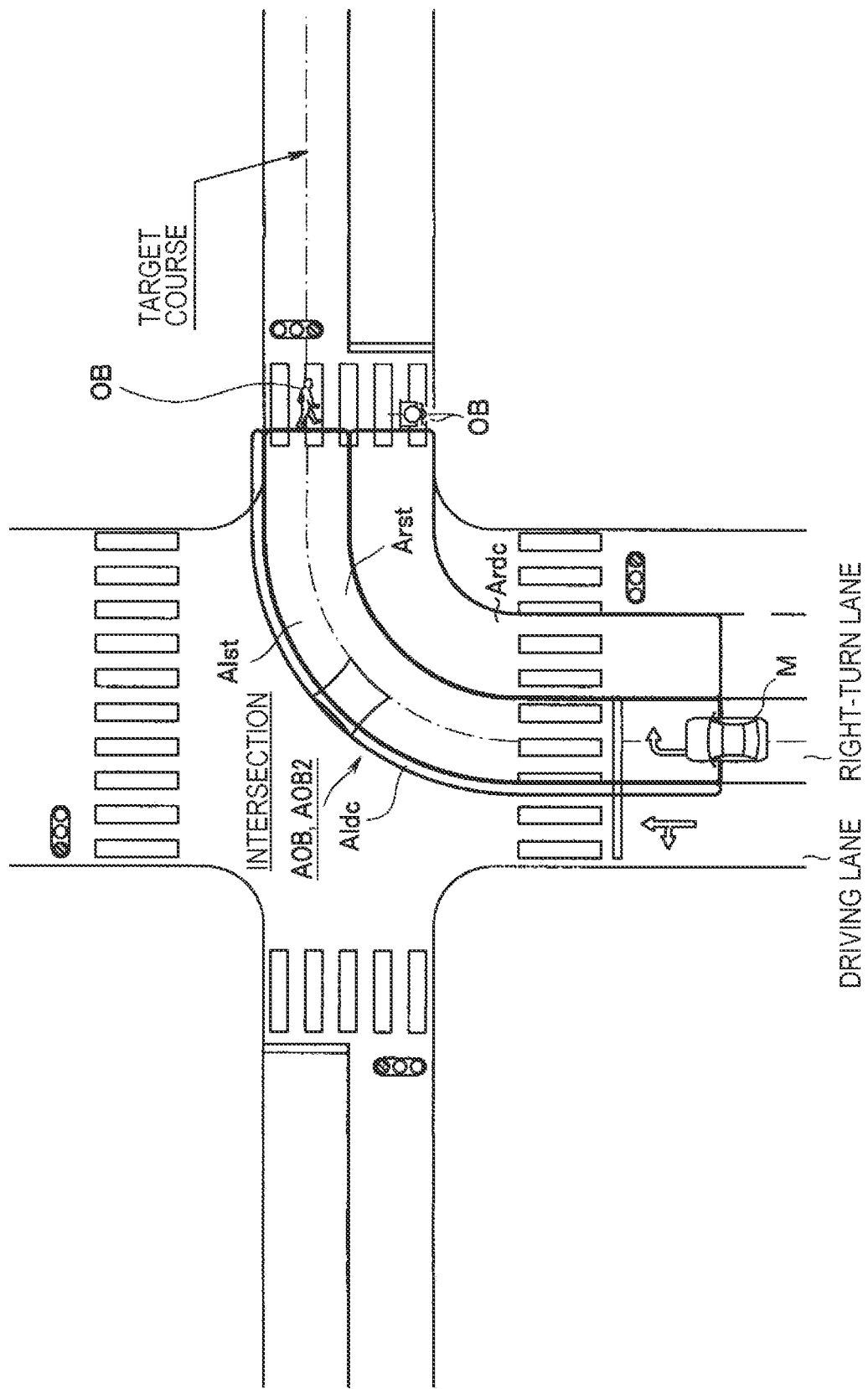

DRIVING ASSISTANCE APPARATUS

CROSS-REFERENCE TO RELATED APPLICATIONS

The present application claims priority from Japanese Patent Application No. 2021-103321 filed on Jun. 22, 2021, the entire contents of which are hereby incorporated by reference.

BACKGROUND

The disclosure relates to a driving assistance apparatus that appropriately controls the vehicle speed of a vehicle in the case where a target object is detected in an object detection area set ahead of the vehicle.

There has been known a driving assistance apparatus that, when the driver (operator) sets a destination, sets a driving route from the current location to the destination, and, in an autonomous driving area, allows the vehicle to autonomously drive in place of the driver. In driving assistance based on autonomous driving on general roads, the driving environment ahead of the vehicle is recognized by a sensing device such as a camera, and whether there are preceding vehicles, the lit color of traffic lights, a direction indicated by an arrow traffic light, and so forth are monitored at all times.

In the case where a preceding vehicle is detected ahead in the driving direction of the vehicle, the vehicle speed of the vehicle is controlled in a certain manner based on the distance and relative speed to the preceding vehicle, and so forth. Meanwhile, in the case where the indication (lit color) of traffic lights installed at an intersection is green (green signal), or, even when the indication of the traffic lights is red (red signal), if a direction indicated by an arrow traffic light is the driving direction of the vehicle, the vehicle is allowed to enter the intersection and drive along a target course set along the driving route, such as driving straight or turning left or right.

At that time, for example, as disclosed in Japanese Unexamined Patent Application Publication (JP-A) No. 2010-79425, there has also been known technology for allowing, in the case where a target object such as a pedestrian crossing a pedestrian crossing is detected on the basis of information from a sensing device, a vehicle to automatically stop just before the target object.

SUMMARY

An aspect of the disclosure provides a driving assistance apparatus to be applied to a vehicle. The driving assistance apparatus includes a driving environment information obtaining unit, a target object recognizer, an object detection area setter, and a driving control arithmetic unit. The driving environment information obtaining unit is configured to obtain driving environment information that is information on a driving environment ahead of the vehicle. The target object recognizer is configured to recognize a target object based on the driving environment information obtained by the driving environment information obtaining unit. The object detection area setter is configured to set, ahead of the vehicle, an object detection area for detecting the target object recognized by the target object recognizer. The driving control arithmetic unit is configured to control a driving state of the vehicle in a case where the target object is detected in the object detection area. The object detection area setter includes a stop area setter and a deceleration area setter. The stop area setter is configured to set a stop area ahead of the vehicle. The deceleration area setter is configured to set a left deceleration area and a right deceleration area respectively to left and right of the stop area set by the stop area setter. The driving control arithmetic unit includes a stop controller and a deceleration controller. The stop controller is configured to control the vehicle to stop in a case where the target object recognized by the target object recognizer is detected in the stop area. The deceleration controller is configured to control the vehicle to decelerate in a case where the target object recognized by the target object recognizer is detected in at least one of the left deceleration area and the right deceleration area.

An aspect of the disclosure provides a driving assistance apparatus to be applied to a vehicle. The driving assistance apparatus includes circuitry. The circuitry is configured to recognize a target object based on driving environment information that is information on a driving environment ahead of the vehicle. The circuitry is configured to set an object detection area ahead of the vehicle for detecting the target object. The circuitry is configured to control a driving state of the vehicle upon detecting the target object in the object detection area. The circuitry is further configured to set a stop area ahead of the vehicle and set a left deceleration area and a right deceleration area respectively to left and right of the stop area. The circuitry is configured to control the vehicle to stop upon detecting the target object in the stop area. The circuitry is configured to control the vehicle to decelerate upon detecting the target object in at least one of the left deceleration area and the right deceleration area.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 14A is a bird's-eye view of an object detection area set before entering the intersection when turning left;

FIG. 14B is a bird's-eye view of an object detection area set after entering the intersection when turning left;

FIG. 15A is a bird's-eye view of an object detection area set before entering the intersection when turning right.

DETAILED DESCRIPTION

In autonomous driving, when a vehicle drives straight in a driving lane or turns left or right from an intersection along a target course, if an object is detected ahead of the vehicle, whether the vehicle may collide with the target object is determined, and, when there is no possibility of a collision, the vehicle is controlled to pass as it is.

In this case, because the driver has already recognized the target object visually before facing the target object ahead of the vehicle, at the time the vehicle faces the target object, the driver feels anxiety about whether the vehicle will automatically stop.

As a countermeasure, for example, as disclosed in JP-A No. 2019-212095, in the case where a target object that is about to cross a pedestrian crossing is detected, it is conceivable that, with autonomous driving control, the vehicle is kept stopped until the target object completely crosses the pedestrian crossing. However, for example, in the case where a target object is crossing a left-hand traffic road ahead of the vehicle from the left-side sidewalk to the right-side sidewalk, that is, moving in a direction to be away from the vehicle, the driver, who is expecting to start the vehicle, feels uncomfortable because autonomous driving control keeps the vehicle stopped until the target object completely crosses the road.

It is desirable to provide a driving assistance apparatus capable of reducing, in the case where a target object is detected ahead of a vehicle, anxiety or uncomfortableness of a driver by appropriately controlling the vehicle speed of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the present embodiment will be described on the assumption that roads are left-hand traffic roads. Therefore, if the present embodiment is to be applied in right-hand traffic regulations, left and right settings or the like may be appropriately set in an opposite manner.

Figure 1:
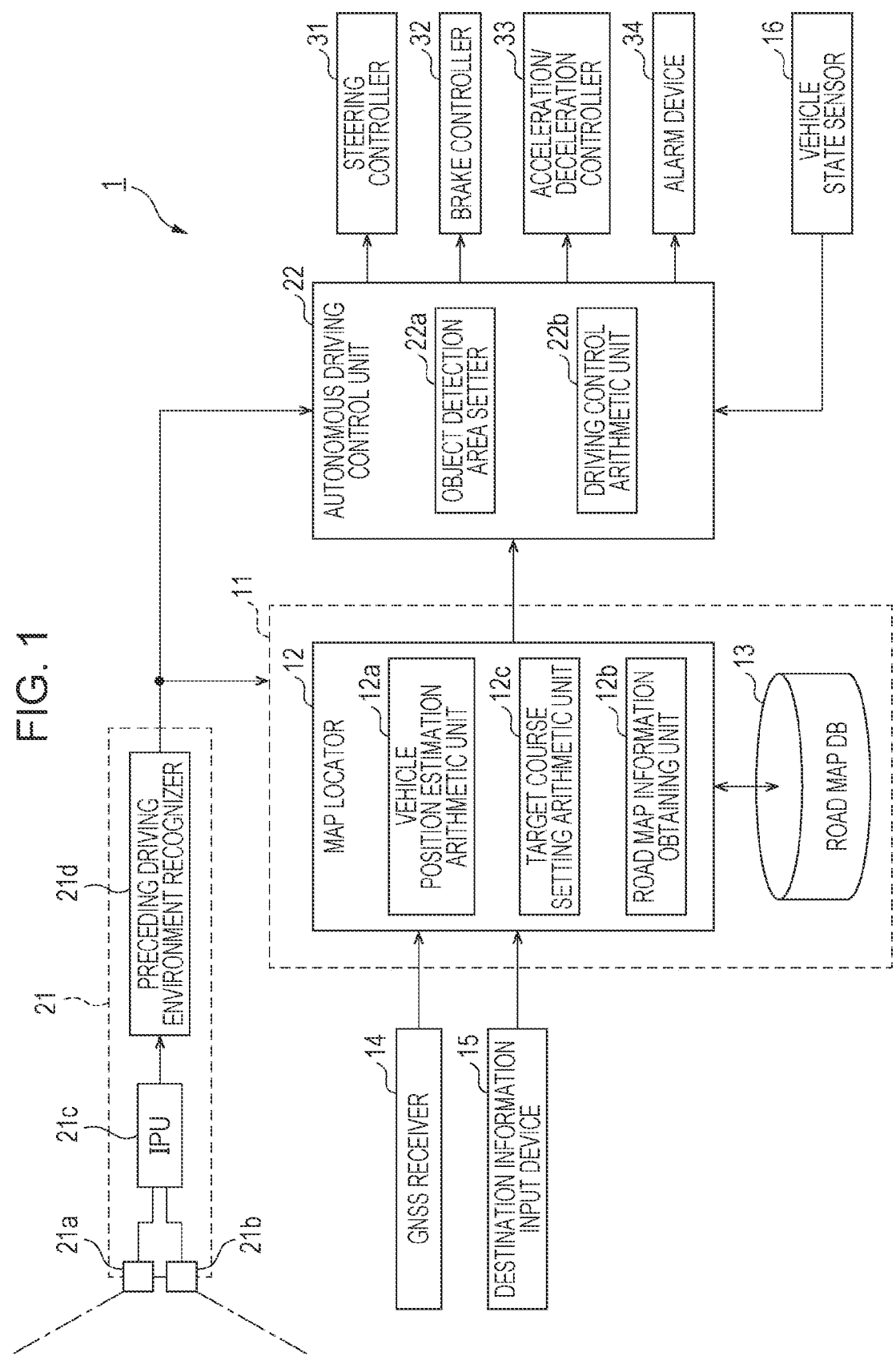
FIG. 1 is a block diagram schematically illustrating a driving assistance apparatus.

A driving assistance apparatus 1 illustrated in FIG. 1 is mounted in a vehicle M (see FIGS. 7 to 15B). The driving assistance apparatus 1 includes a locator unit 11, a camera unit 21, and an autonomous driving control unit 22. In one embodiment, the camera unit 21 may serve as a "driving environment information obtaining unit".

The locator unit 11 estimates the position (vehicle position) of the vehicle M on a road map, and obtains road map data around the vehicle position. Meanwhile, the camera unit 21 obtains driving environment information ahead of the vehicle M to recognize lane markings that separate a lane (driving lane) where the vehicle M is driving, road shapes, pedestrian crossings, preceding vehicles, and target objects such as pedestrians and bicycles, and obtains the road curvature at the center of the lane markings, the distance and relative speed to the preceding vehicle, and so forth.

The locator unit 11 includes a map locator arithmetic unit 12 and a high-precision road map database 13. The map locator arithmetic unit 12, a later-described preceding driving environment recognizer 21d, and the autonomous driving control unit 22 are formed of a microcontroller that includes a central processing unit (CPU), random-access memory (RAM), read-only memory (ROM), rewritable nonvolatile memory (flash memory or electronically erasable programmable read-only memory (EEPROM)), and a peripheral device. The ROM stores programs and fixed data necessary for the CPU to execute processes. The RAM is provided as a work area for the CPU, where various types of data used in the CPU are stored. Note that the CPU is also called a microprocessor (MPU) or a processor. Meanwhile, a graphics processing unit (GPU) or a graph streaming processor (GSP) may be used in place of the CPU. Alternatively, the CPU, GPU, and GSP may be selectively combined and used.

In addition, a Global Navigation Satellite System (GNSS) receiver 14 and a destination information input device 15 are connected to the input side of the map locator arithmetic unit 12. The GNSS receiver 14 receives positioning signals transmitted from a plurality of positioning satellites. Meanwhile, when the driver who is the operator inputs destination information (address, phone number, selection from a list of registered destinations displayed on a monitor, etc.), the destination information input device 15 obtains corresponding position coordinates (longitude and latitude), and sets the position coordinates as the destination.

The map locator arithmetic unit 12 includes a vehicle position estimation arithmetic unit 12a, a road map information obtaining unit 12b, and a target course setting arithmetic unit 12c. The vehicle position estimation arithmetic unit 12a obtains position coordinates (longitude and latitude) which are the position information of the vehicle M on the basis of the positioning signals received by the GNSS receiver 14.

The road map information obtaining unit 12b performs map matching between the position coordinates of the vehicle M and the position coordinates (longitude and latitude) of the destination set by the destination information input device 15 on a road map stored in the high-precision road map database 13. The road map information obtaining unit 12b identifies both positions, and transmits road map information from the current vehicle position to the surroundings of the destination to the target course setting arithmetic unit 12c. The high-precision road map database 13 is a large-capacity storage medium such as a hard disk drive (HDD), and stores highly precise road map information (dynamic maps). The high-precision road map information holds lane data (lane width data, lane center position coordinate data, lane driving azimuth data, speed limit, etc.) necessary for performing autonomous driving.

The target course setting arithmetic unit 12c first generates a driving route connecting the current position and the destination, which are map-matched by the road map information obtaining unit 12b, on the road map. Next, the target course setting arithmetic unit 12c sequentially sets and updates a target course (driving straight, turning left or right from an intersection, a driving lane such as the left lane, center lane, or right lane in the case of a straight road, the horizontal position within the lane, etc.), which is the driving direction for allowing the vehicle M to autonomously drive, for hundreds to several kilometers ahead of the vehicle M. Note that information of the target course is read by the autonomous driving control unit 22.

In contrast, the camera unit 21 is fixed in the upper center of the front part of the occupant compartment of the vehicle M. The camera unit 21 includes on-board cameras (stereo cameras) including a main camera 21a and a sub-camera 21b, an image processing unit (IPU) 21c, and the preceding driving environment recognizer 21d. Both the cameras 21a and 21b are arranged at symmetrical positions with respect to the center in the vehicle width direction with a certain baseline length. Both the cameras 21a and 21b are wide-angle cameras, as illustrated by dot-dash lines in FIG. 1, and are capable of imaging a wide range horizontally in the vehicle width direction immediately in front of the vehicle M. Note that both the cameras 21a and 21b may be 360-degree cameras.

In the camera unit 21, driving environment image information obtained by imaging, by both the cameras 21a and 21b, a certain imaging area ahead of the vehicle M is subjected to certain image processing by the IPU 21c. The preceding driving environment recognizer 21d reads the driving environment image information, which has been image-processed by the IPU 21c, and, on the basis of the driving environment image information, recognizes and obtains the driving environment ahead. The to-be-obtained driving environment information ahead includes the road shape (road curvature [1/m] at the center of lane markings that separate the left and right, and the width between the left and right lane markings (lane width)) of a course (vehicle course) where the vehicle M is driving, intersections, still objects such as traffic signs, target objects such as pedestrians and bicycles, and the indication (lit color) of traffic lights. In one embodiment, the preceding driving environment recognizer 21d may serve as a "target object recognizer".

In this case, the camera unit 21 may be a monocular camera with the main camera 21a alone, and one or a combination of an ultrasonic sensor, a millimeter wave radar, a microwave radar, an infrared sensor, a laser radar, and Light Detection And Ranging (LiDAR) may be adopted in place of the sub-camera 21b, thereby searching a wide area in front of the vehicle M.

The autonomous driving control unit 22 includes an object detection area setter 22a and a driving control arithmetic unit 22b. The map locator arithmetic unit 12, the preceding driving environment recognizer 21d of the camera unit 21, and a vehicle state sensor 16 are connected to the input side of the autonomous driving control unit 22. The vehicle state sensor 16 is a collective term for a group of sensors that detect various states regarding the vehicle M. The vehicle state sensor 16 includes a vehicle speed sensor that detects the vehicle speed (vehicle speed) of the vehicle M, an acceleration sensor that detects forward/backward acceleration acting on the vehicle M, a yaw rate sensor that detects a yaw rate acting on the vehicle M, and a brake sensor that detects the pressing of a brake pedal.

A steering controller 31, which controls the vehicle M to drive along the target course, a brake controller 32, which controls the vehicle M to decelerate by forced braking, an acceleration/deceleration controller 33, which controls the output of drive sources (engines, motors, etc.) mounted in the vehicle M, and an alarm device 34 are connected to the output side of the autonomous driving control unit 22.

The object detection area setter 22a reads the target course where the vehicle M is currently driving, which has been set by the target course setting arithmetic unit 12c of the map locator arithmetic unit 12, and obtains a driving lane width WLINE on the target course from the high-precision road map database 13. Note that the driving lane width WLINE may be obtained from the driving environment of the vehicle M imaged by the camera unit 21.

Figure 8:
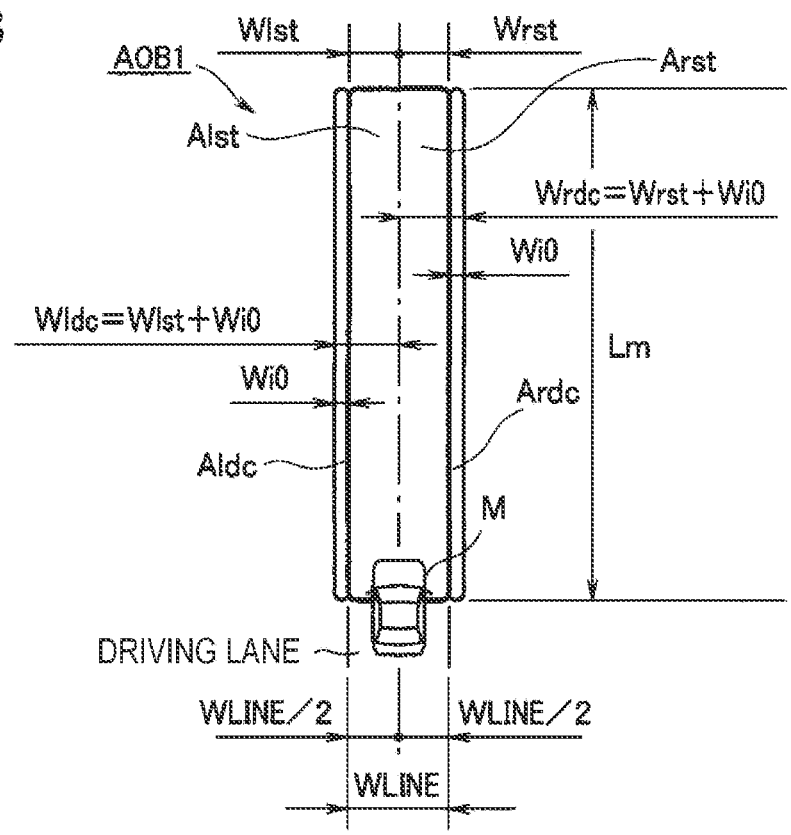
FIG. 8 is a bird's-eye view illustrating an object detection area set when driving in a driving lane with no adjacent lanes on the left and right sides.
Figure 9:
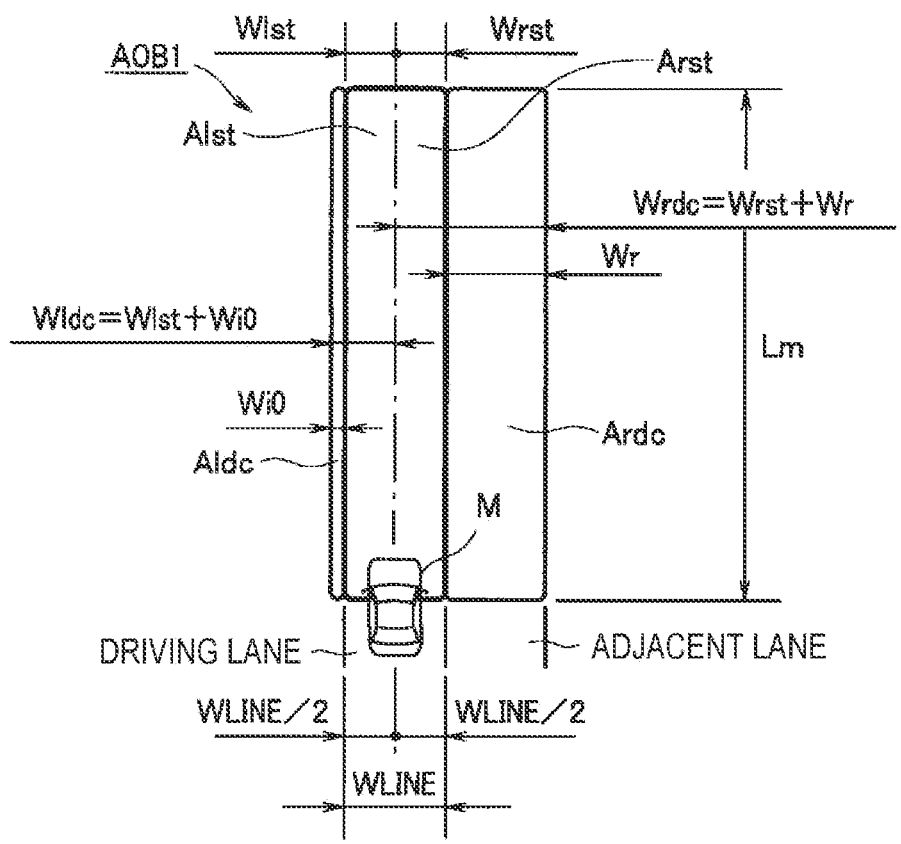
FIG. 9 is a bird's-eye view illustrating an object detection area set when driving in a driving lane with an adjacent lane on the right side and not turning left or right.
Figure 10:
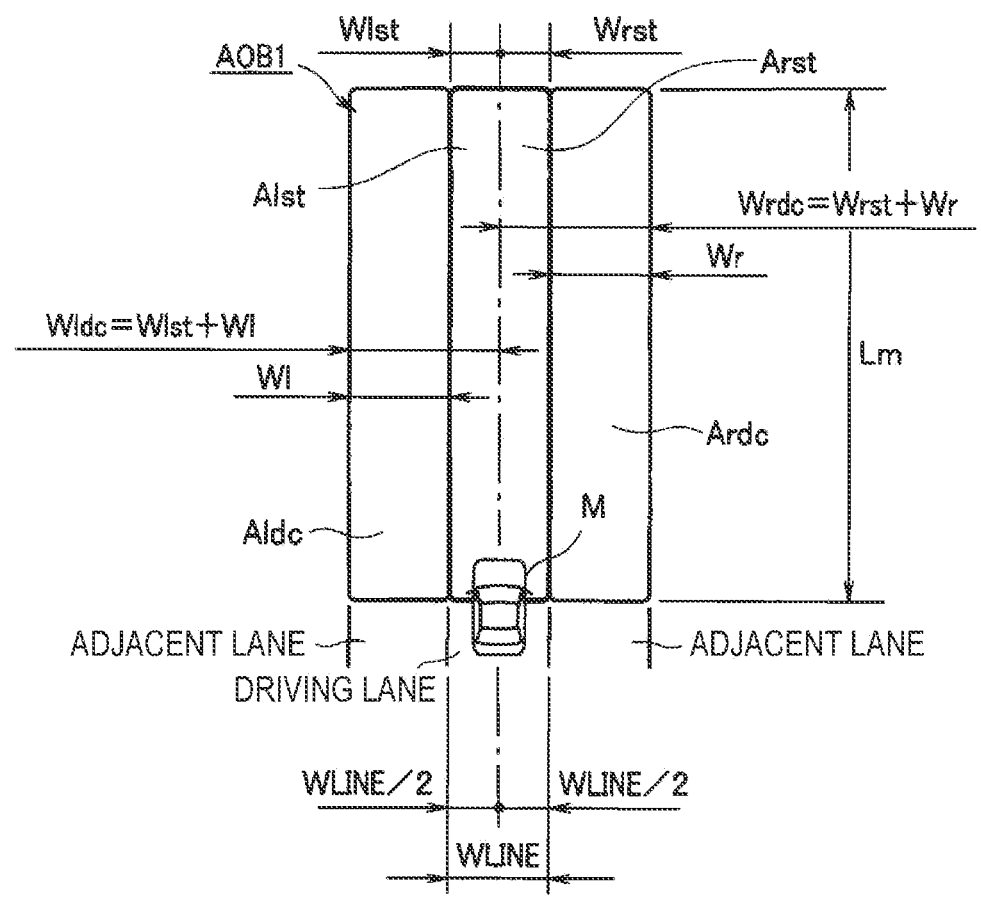
FIG. 10 is a bird's-eye view illustrating an object detection area set when driving in a driving lane with adjacent lanes on both sides.
Figure 11A:
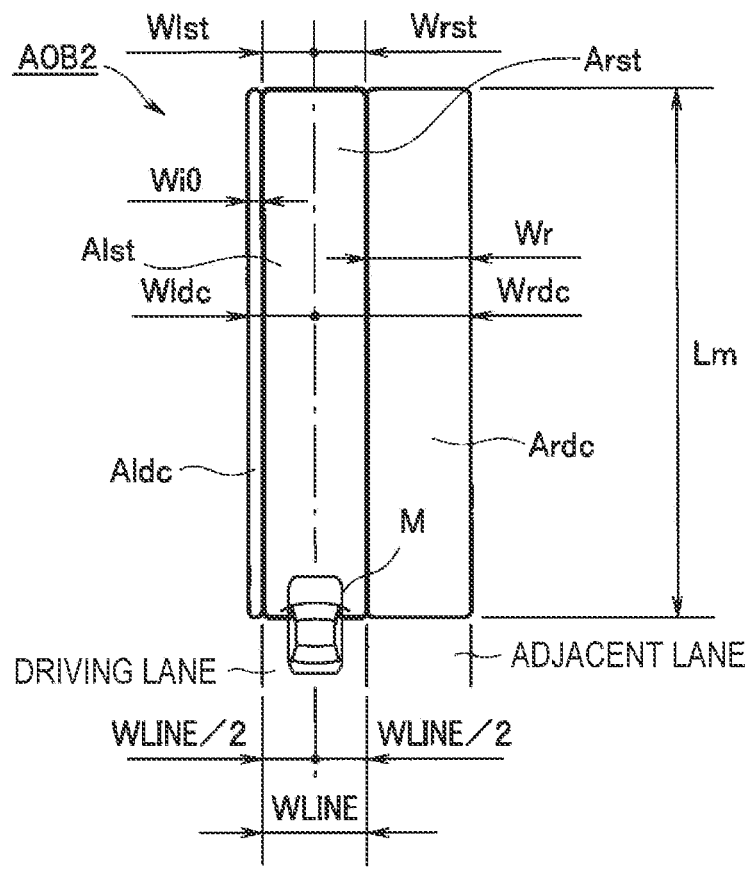
FIG. 11A is a bird's-eye view illustrating an object detection area set before entering an intersection when turning left or right.
Figure 11B:
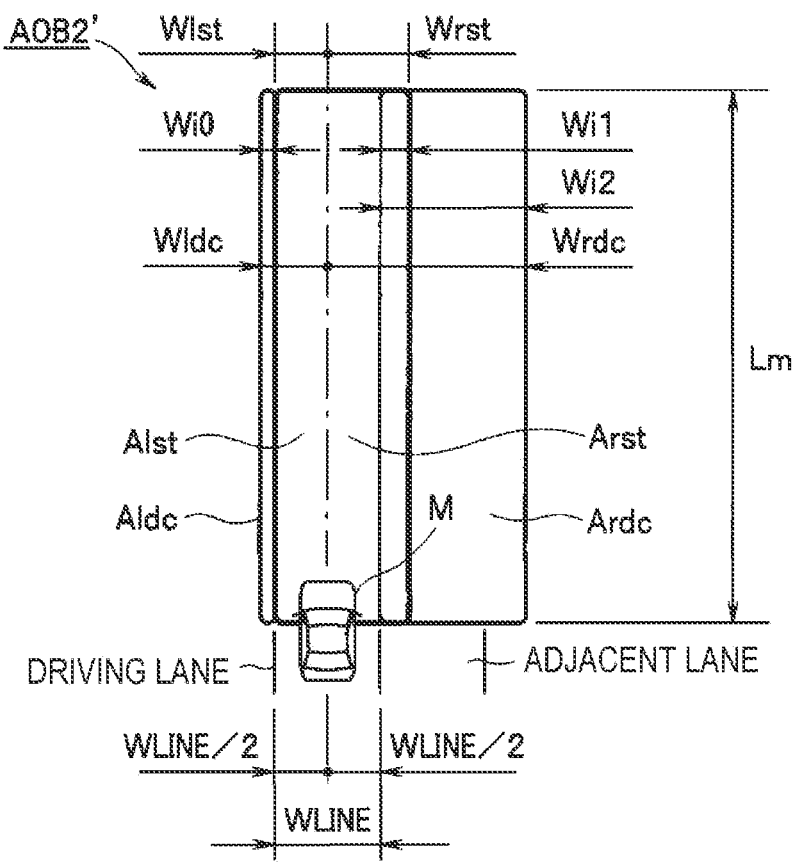
FIG. 11B is a bird's-eye view illustrating an object detection area set after entering the intersection when turning left or right.

On the basis of the driving lane width WLINE, an object detection area AOB is set to a course length Lm (such as 20 to 40 [m]) from the vehicle M along the target course. The object detection area AOB includes an other-than-left/right-turn object detection area AOB1, which is set when driving and not turning left or right, such as a straight road or a curved road, as illustrated in FIGS. 8 to 10; a left/right-turn object detection area AOB2, which is set before entering an intersection when turning left or right, as illustrated in FIG. 11A; and an object detection area AOB2', which is set after entering an intersection when turning left or right, as illustrated in FIG. 11B. Note that the settings of the object detection areas AOB1, AOB2, and AOB2' will be described later.

The driving control arithmetic unit 22b checks whether a target object OB is detected in the object detection area AOB set by the object detection area setter 22a, and, in the case where a target object OB is detected in the object detection area AOB, controls the driving state of the vehicle M in accordance with the position relationship between the vehicle M and the target object OB.

Note that, in the present embodiment, the target object OB is limited to a moving object, such as a pedestrian or a bicycle, permitted to move on sidewalks. The target object OB is recognized using template matching or feature detection of the related art, for example, on the basis of environment information read by the preceding driving environment recognizer 21d.

Figure 2:
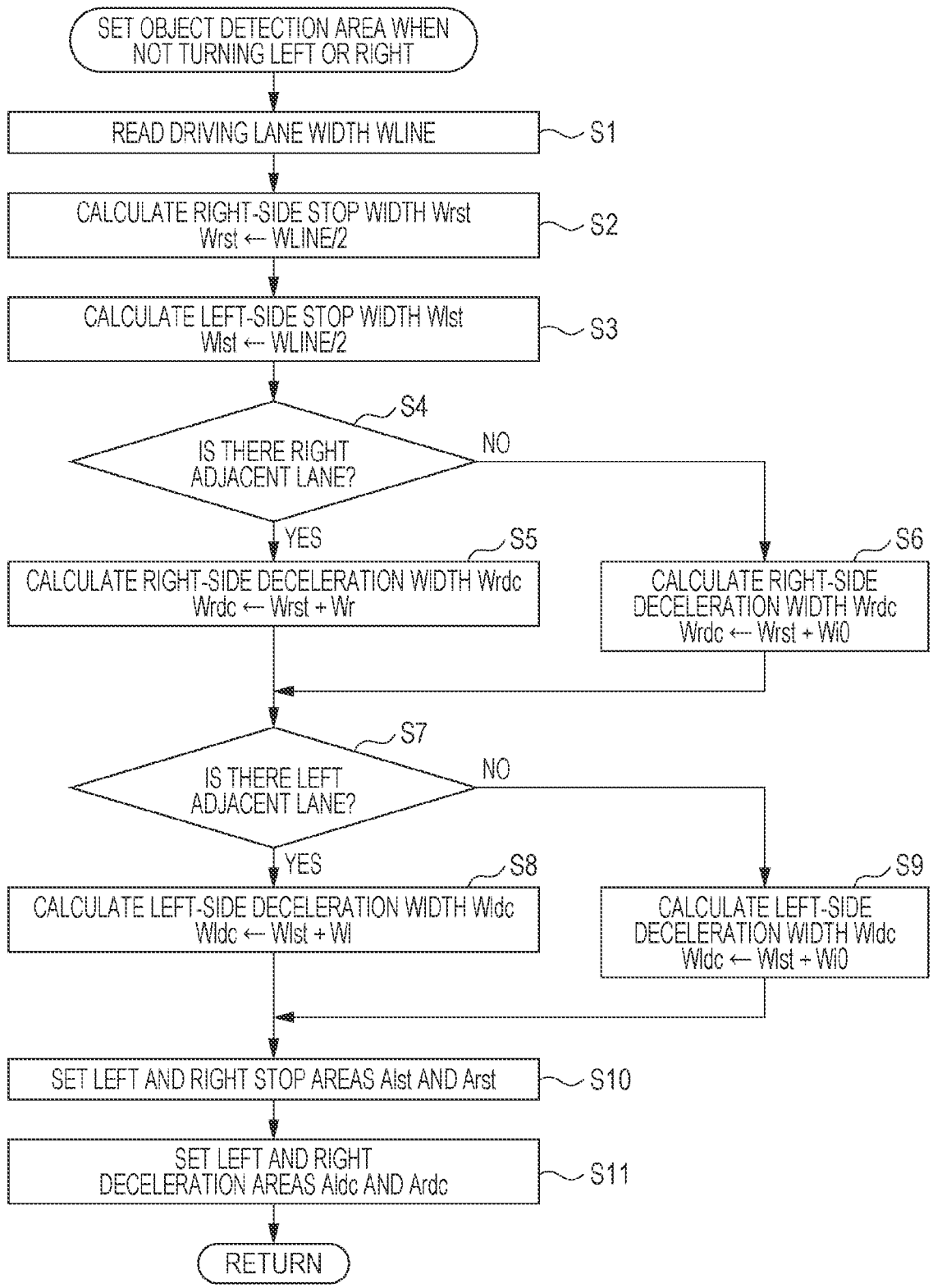
FIG. 2 is a flowchart illustrating a routine for setting an object detection area when not turning left or right.
Figure 3A:
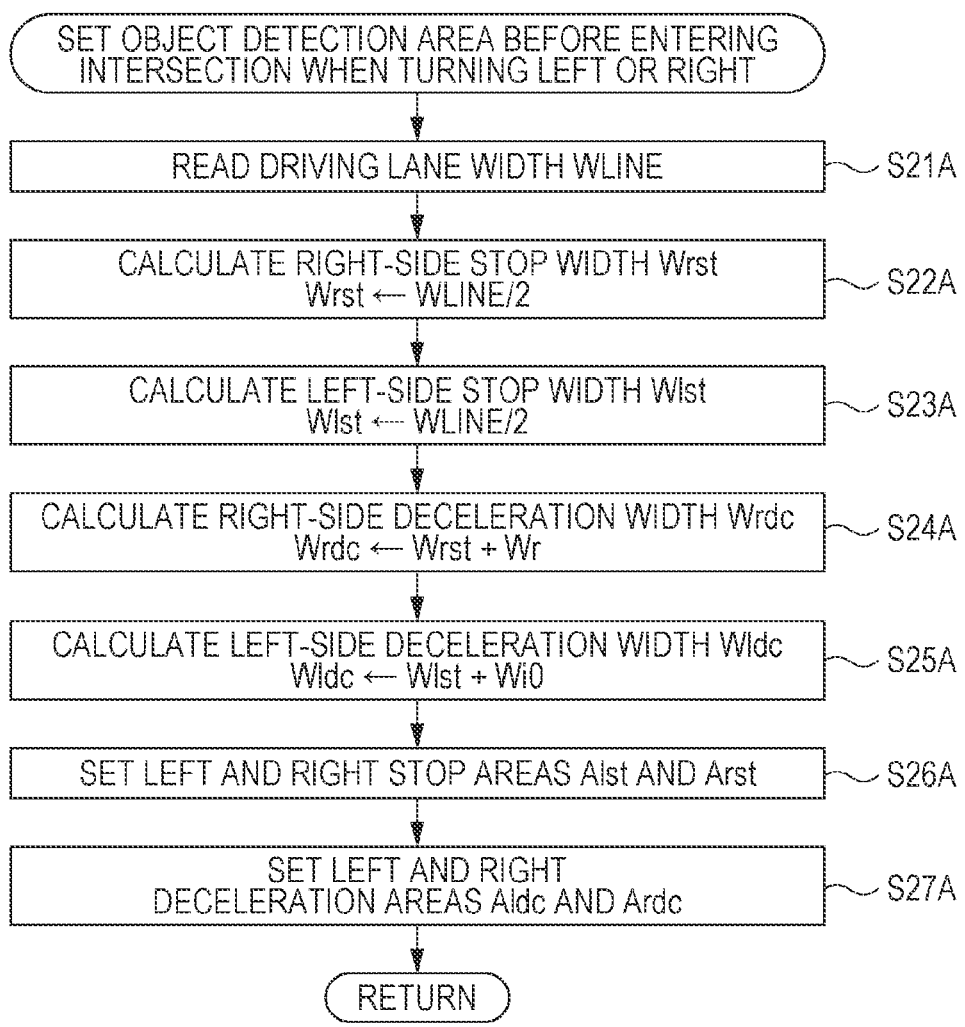
FIG. 3A is a flowchart illustrating a routine for setting an object detection area before entering an intersection when turning left or right.
Figure 3B:
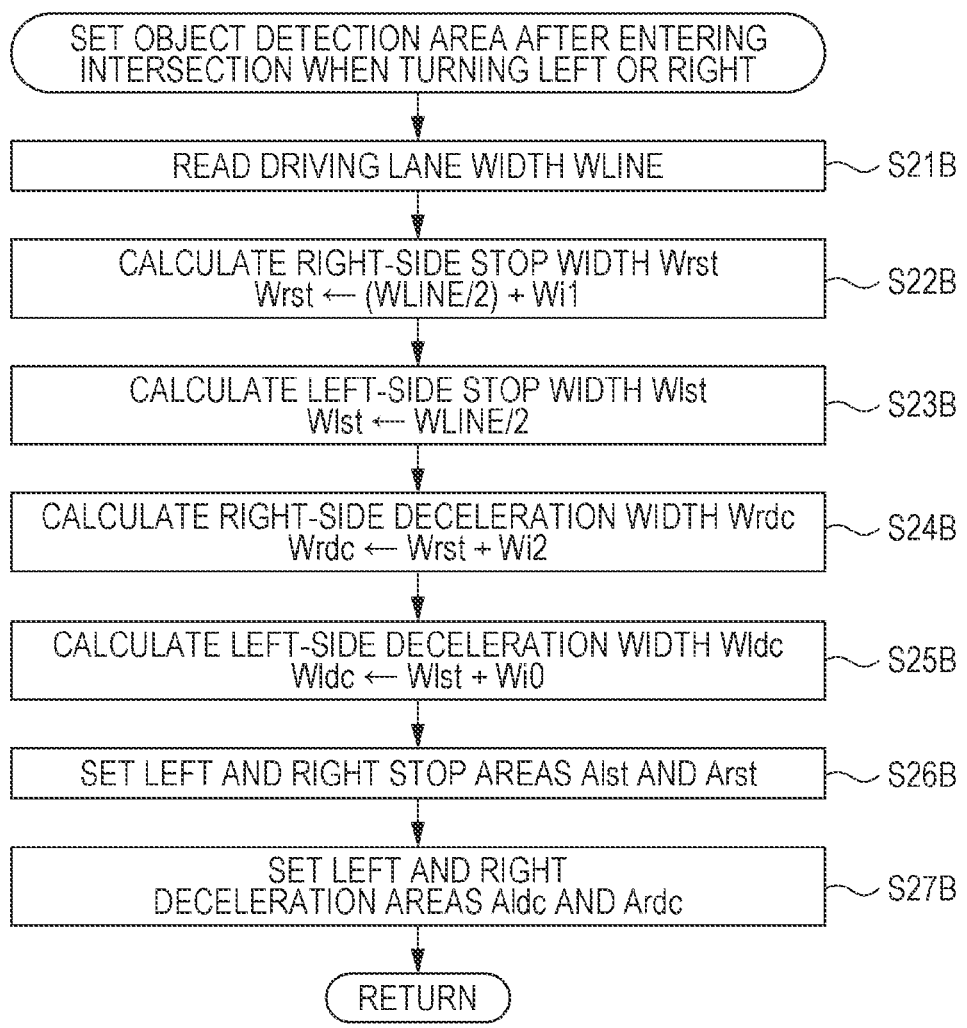
FIG. 3B is a flowchart illustrating a routine for setting an object detection area after entering an intersection when turning left or right.

In the above-described object detection area setter 22a, the object detection areas AOB1, AOB2, and AOB2' are individually set in accordance with the driving lane width WLINE and the left and right adjacent lane widths W1 and Wr (see FIGS. 9 to 11B). The other-than-left/right-turn object detection area AOB1 is set in accordance with a routine for setting an object detection area when not turning left or right, which is illustrated in FIG. 2. In contrast, the before-entering-intersection left/right-turn object detection area AOB2 is set in accordance with a routine for setting an object detection area before entering an intersection when turning left or right, which is illustrated in FIG. 3A, and the after-entering-intersection left/right-turn object detection area AOB2' is set in accordance with a routine for setting an object detection area after entering an intersection when turning left or right, which is illustrated in FIG. 3B.

At first, the routine for setting an object detection area when not turning left or right (straight road, curved road, etc.), which is illustrated in FIG. 2, will be described. In this routine, in step S1, the lane width (driving lane width) WLINE of the current lane where the vehicle M is driving is read. The driving lane width WLINE is obtained from information stored in the high-precision road map database 13 of the locator unit 11. Alternatively, the driving lane width WLINE may be obtained from the driving environment ahead of the vehicle M imaged by the camera unit 21.

Figure 7:
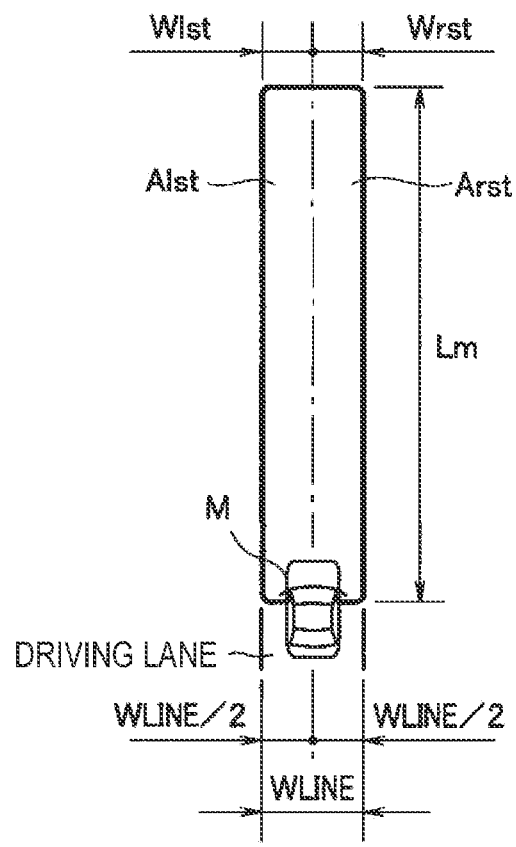
FIG. 7 is a diagram of stop areas.

Next, in step S2, a right-side stop width Wrst is calculated (Wrst←WLINE/2), and, in step S3, a left-side stop width Wlst is calculated (Wlst←WLINE/2). That is, as illustrated in FIG. 7, the right-side stop width Wrst and the left-side stop width Wlst are set by the left and right road widths (WLINE/2) with reference to the center (lane width center) of the width WLINE of the driving lane set as the target course. In the case where a target object OB is detected in the areas of the left and right stop widths Wlst and Wrst, the later-described driving control arithmetic unit 22b executes stop control to allow the vehicle M to stop just before the target object OB.

After that, in step S4, it is checked whether an adjacent lane (right adjacent lane) is detected on the right side of the driving lane. Whether there is the right adjacent lane is obtained from information stored in the high-precision road map database 13 of the locator unit 11, or from the driving environment ahead of the vehicle M imaged by the camera unit 21.

In the case where the right adjacent lane is detected, the routine proceeds to step S5. Meanwhile, in the case where the vehicle M is driving in the rightmost lane or on a road with a single lane on each side, and therefore no right adjacent lane is detected, the routine branches to step S6.

In step S5, a right-side deceleration width Wrdc is calculated using the following formula, and the routine proceeds to step S7:

$$Wrdc \leftarrow Wrst + Wr$$

where Wr is the lane width of the right adjacent lane.

Meanwhile, when the routine branches to step S6, the right-side deceleration width Wrdc is calculated using the following formula, and the routine proceeds to step S7:

$$Wrdc \leftarrow Wrst + Wi0$$

where Wi0 is the initial widening amount (shift amount) for setting a deceleration area, and is set to a relatively narrow value (such as 0.3 to 0.5 [m]) since there is no adjacent lane.

Next, when the routine proceeds to step S7 from step S5 or step S6, it is checked whether an adjacent lane (left adjacent lane) is detected on the left side of the driving lane. In the case where the left adjacent lane is detected, the routine proceeds to step S8. Meanwhile, in the case where the vehicle M is driving in the leftmost lane or on a road with a single lane on each side, and therefore no left adjacent lane is detected, the routine branches to step S9.

In step S8, a left-side deceleration width Wldc is calculated using the following formula, and the routine proceeds to step S10:

$$Wldc \leftarrow Wlst + Wl$$

where Wl is the lane width of the left adjacent lane.

Meanwhile, when the routine branches to step S9, the left-side deceleration width Wldc is calculated using the following formula, and the routine proceeds to step S10:

$$Wldc \leftarrow Wlst + Wi0$$

In the case where a target object OB is detected in the area of the right-side deceleration width Wrdc calculated in step S5 or S6 or the area of Wldc calculated in step S8 or S9, the autonomous driving control unit 22 sets, using the later-described driving control arithmetic unit 22b, a target deceleration for allowing the vehicle M to pass by the side of the target object OB by driving at a slower speed.

For example, in the case of a road with a single lane on each side, as illustrated in FIG. 8, since there is no adjacent lane on both sides of the driving lane, if the driving lane width WLINE is 3.5 [m], the left and right stop widths Wlst and Wrst are both 1.75 [m], and therefore the right-side deceleration width Wrdc and the left-side deceleration width Wldc are each 1.75+Wi0 [m]. Meanwhile, as illustrated in FIG. 9, in the case where the vehicle M is driving in the leftmost driving lane of a road with two or more lanes on each side, the right-side deceleration width Wrdc is 1.75+Wr [m], and the left-side deceleration width Wldc is 1.75+Wi0 [m]. Furthermore, as illustrated in FIG. 10, for example, in the case where the vehicle M is driving in the center of three lanes on each side as the driving lane, because there are adjacent lanes on the left and right sides, the right-side deceleration width Wrdc is 1.75+Wr [m], and the left-side deceleration width Wldc is 1.75+Wl [m].

Next, when the routine proceeds to step S10 from step S8 or step S9, the left and right stop areas Alst and Arst are set. As illustrated in FIGS. 8 to 10, the left and right stop areas Alst and Arst are areas surrounded by the left and right stop widths Wlst and Wrst and the course length Lm set in advance from the vehicle M. Note that the processing in steps S2, S3, and S10 described above and in steps S22A, S23A, and S26A and in steps S22B, S23B, and S26B described later corresponds to a stop area setter of the disclosure.

In step S11, the left and right deceleration areas Aldc and Ardc are set, and the routine is exited. Note that the processing in steps S5, S6, S8, S9, and S11 described above and in steps S24A, S25A, and S27A and in steps S24B, S25B, and S27B described later corresponds to a deceleration area setter of the disclosure.

As illustrated in FIGS. 8 to 10, the left and right deceleration areas Aldc and Ardc are areas surrounded by the left and right deceleration widths Wldc and Wrdc and the course length Lm set in advance from the vehicle M, from which overlapping areas with the left and right stop areas Alst and Arst set in step S10 are excluded, that is, are set to both sides of the driving lane width WLINE.

Note that the left and right stop areas Alst and Arst and the left and right deceleration areas Aldc and Ardc form the other-than-left/right-turn object detection area AOB1. The other-than-left/right-turn object detection area AOB1 is applied in the later-described driving control routine in the case where the target course is set to driving in a direction other than turning left or right at an intersection (straight, curved, etc.).

Figure 12:
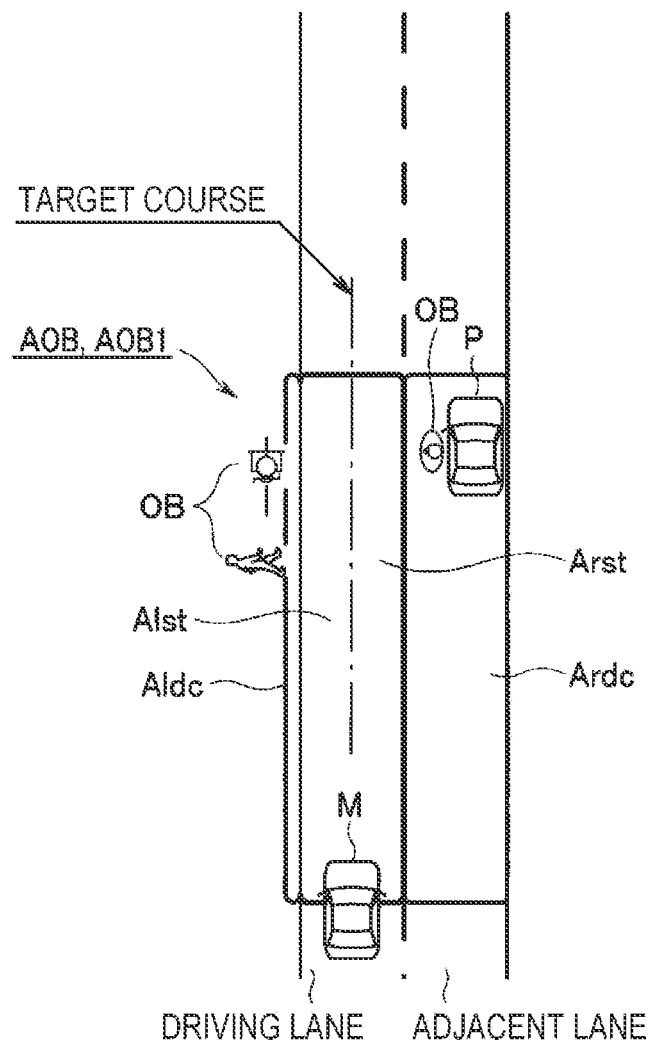
FIG. 12 is a bird's-eye view of an object detection area set when driving in a driving lane with an adjacent lane.
Figure 13:
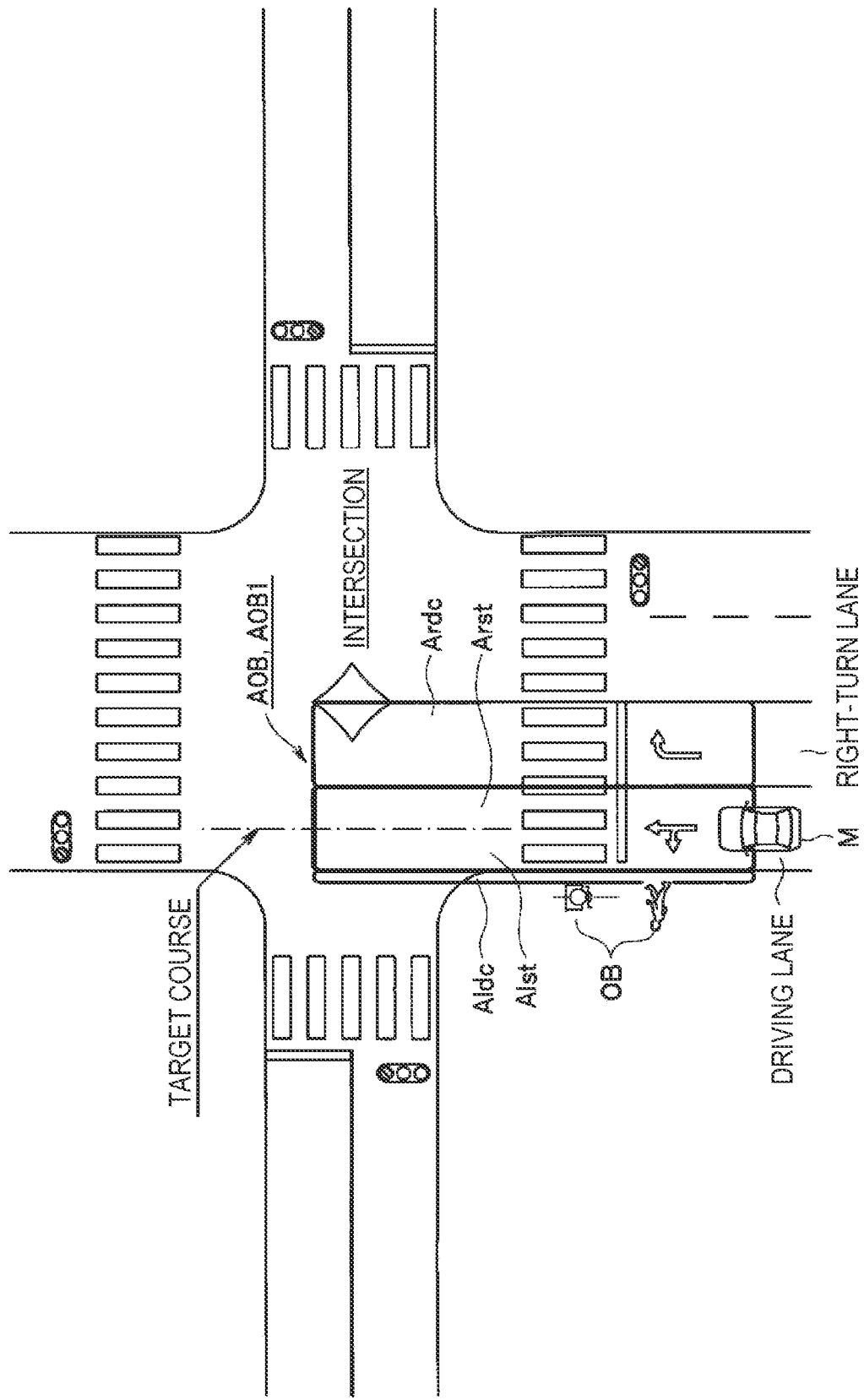
FIG. 13 is a bird's-eye view of an object detection area set when driving in a driving lane with an adjacent lane just before the intersection.

By the way, as illustrated in FIGS. 12 and 13, in the case where the target course of the vehicle M is set to the direction of driving straight, the target course and the direction the vehicle M is facing substantially match. Therefore, if the stop areas Alst and Arst are set with the same width as the driving lane width WLINE, because automatic stop control described later is executed in response to detection of a target object OB ahead of the vehicle M, the vehicle M may be controlled to stop safely just before the target object OB.

Meanwhile, since the left deceleration area Aldc is set on the left side of the stop area Alst with the initial widening amount Wi0, in the case where a target object (bicycle or pedestrian) OB is detected in the left deceleration area Aldc, the vehicle M may be allowed to pass without stopping by driving at a slower speed. By setting the left deceleration area Aldc with the initial widening amount Wi0, unnecessary deceleration may be prevented when the vehicle M passes by a target object OB that moves laterally away from the vehicle M.

In contrast, the right side of the vehicle M is an adjacent lane if the road has two or more lanes on each side or is the opposite lane if the road has a single lane on each side, and, if the vehicle M is driving, the probability that a target object (bicycle or pedestrian) OB passes is low. However, as illustrated in FIG. 12, if there is a parked vehicle P such as a broken-down vehicle in the adjacent lane, there is a possibility that an occupant of the parked vehicle P rushes out to the driving lane of the vehicle M. Therefore, by setting the right deceleration area Ardc on the right side of the stop area Arst with the adjacent lane width Wr, in the case where a target object (occupant) OB is detected in the right deceleration area Ardc, the vehicle M may be allowed to pass by driving at a slower speed.

Furthermore, the object detection area setter 22a sets the before-entering-intersection left/right-turn object detection area AOB2 in accordance with the routine for setting an object detection area before entering an intersection when turning left or right, which is illustrated in FIG. 3A. In this routine, firstly in steps S21A to S23A, like steps S1 to S3 described above, the left and right-side stop widths are calculated on the basis of the driving lane width WLINE (Wlst←WLINE/2 and Wrst←WLINE/2).

After that, the routine proceeds to step S24A, and the right-side deceleration width Wrdc is calculated on the basis of the right-side stop width Wrst and the right adjacent lane width Wr (Wrdc←Wrst+Wr). Note that the driving lane width WLINE is applied as the right adjacent lane width Wr when turning right.

After that, the routine proceeds to step S25A, and the left-side deceleration width Wldc is calculated on the basis of the left-side stop width Wlst and the pre-set initial widening amount (shift amount) Wi0 (Wldc←Wlst+Wi0).

In the case where a target object OB is detected in the areas of the left and right deceleration widths Wldc and Wrdc when the vehicle M enters the intersection to turn left or right by autonomous driving, the later-described driving control arithmetic unit 22b sets a target deceleration for allowing the vehicle M to pass near the target object OB by driving at a slower speed.

After that, when the routine proceeds to step S26A, the left and right stop areas Alst and Arst before entering the intersection when turning left or right are set. As illustrated in FIG. 11A, the left and right stop areas Alst and Arst are areas surrounded by the left and right stop widths Wlst and Wrst and the course length Lm set in advance from the vehicle M.

Next, when the routine proceeds to step S27A, the left and right deceleration areas Aldc and Ardc are set, and the routine is exited. As illustrated in FIG. 11A, the left and right deceleration areas Aldc and Ardc are areas surrounded by the left and right deceleration widths Wldc and Wrdc and the pre-set course length Lm ahead of the vehicle M, from which overlapping areas with the left and right stop areas Alst and Arst set in step S26A are excluded.

Therefore, the left deceleration area Aldc is set to the left of the driving lane width WLINE with the width of the initial widening amount Wi0. In contrast, the right deceleration area Ardc is set to the right side of the driving lane width WLINE with the width of the right adjacent lane width Wr. Note that the left and right stop areas Alst and Arst and the left and right deceleration areas Aldc and Ardc form the before-entering-intersection left/right-turn object detection area AOB2.

By the way, as illustrated in FIG. 14A, in the case where the target course of the vehicle M is set to the direction of turning left from the intersection, the left/right-turn object detection area AOB2 is set from the driving lane before the intersection to the driving lane side in the direction of turning left along the target course. Therefore, for example, as illustrated in FIG. 14A, when a target object (pedestrian) OB is crossing the pedestrian crossing from the sidewalk on the opposite lane side ahead of the left turn, in the case where the target object (pedestrian) OB is detected in the right deceleration area Ardc of the left/right-turn object detection area AOB2 set ahead of the vehicle M, the autonomous driving control unit 22 executes deceleration control.

In contrast, as illustrated in FIG. 14A, in the case where a target object (bicycle) OB moving rightward from the left on the pedestrian crossing is detected in the left and right stop areas Alst and Arst set in the driving lane ahead of the left turn, the autonomous driving control unit 22 executes stop control.

In this case, if no right deceleration area Ardc is set next to the right stop area Arst as in the related art, because a target object (pedestrian) OB is not captured in the left and right stop areas Alst and Arst, the vehicle M passes by the side of the target object (pedestrian) OB without slowing down. However, because the driver is aware of the target object (pedestrian) OB ahead of the left turn, the driver feels anxiety about whether the vehicle M will actually stop when the vehicle M approaches the target object (pedestrian) OB.

In contrast, in the present embodiment, since the right deceleration area Ardc is set to the right of the right stop area Arst, in the case where a target object (pedestrian) OB is detected in the right deceleration area Ardc, deceleration control is performed to allow the vehicle M to drive at a slower speed, and therefore this gives no anxiety to the driver.

In contrast, as illustrated in FIG. 14A, the left deceleration area Aldc set in the left/right-turn object detection area AOB2 is uniformly set with the width of the initial widening amount Wi0 next to the left stop area Alst. Thus, an object (pedestrian, bicycle, etc.) on the sidewalk is prevented from being wrongly recognized as a to-be-controlled object OB, and execution of unnecessary deceleration control is prevented.

Next, the setting of the after-entering-intersection left/right-turn object detection area AOB2' will be described in accordance with the routine illustrated in FIG. 3B.

In this routine, firstly in step S21B, the lane width (driving lane width) WLINE of the current lane where the vehicle M is driving is read. The routine proceeds to step S22B, and the right-side stop width Wrst is calculated using the following formula:

$$Wrst \leftarrow (WLINE/2) + Wi1$$

where Wi1 is a first widening amount (shift amount). Therefore, the right-side stop width Wrst is set wider than the left-side stop width Wlst by the first widening amount Wi1.

Note that the first widening amount Wi1, the initial widening amount Wi0, and a later-described second widening amount Wi2 have the relationship Wi2>Wi1>Wi0, and the second widening amount Wi2 is set wider than the width of a lane adjacent to the driving lane of the vehicle M. In the present embodiment, Wi1 is set to about 1 [m], and Wi2 is set to about 5 [m].

Next, in step S23B, the left-side stop width Wlst is calculated (Wlst←WLINE/2), and the routine proceeds to step S24B. In step S24B, the right-side deceleration width Wrdc is calculated on the basis of the right-side stop width Wrst and the second widening amount Wi2 (Wrdc←Wrst+ Wi2). Therefore, the right-side deceleration width Wrdc is set wider than the right-side deceleration width Wrdc set before entering the intersection (see FIGS. 11A and 11B). After that, the routine proceeds to step S25B, and the left-side deceleration width Wldc is calculated on the basis of the left-side stop width Wlst and the initial widening amount Wi0 (Wldc←Wlst+Wi0).

In the case where the vehicle M enters the intersection to turn left or right by autonomous driving, the vehicle M becomes closer to the pedestrian crossing ahead of the left or right turn than before entering the intersection. Thus, by setting the right-side deceleration width Wrdc wider, deceleration control may be executed at an early stage in response to detection of a target object OB.

After that, when the routine proceeds to step S26B, the left and right stop areas Alst and Arst after entering the intersection are set. As illustrated in FIG. 11B, the left and right stop areas Alst and Arst are areas surrounded by the left and right stop widths Wlst and Wrst and the course length Lm set ahead in advance from the vehicle M.

Next, when the routine proceeds to step S27B, the left and right deceleration areas Aldc and Ardc are set, and the routine is exited. As illustrated in FIG. 11B, the left and right deceleration areas Aldc and Ardc are areas surrounded by the left and right deceleration widths Wldc and Wrdc and the course length Lm set in advance ahead of the vehicle M, from which overlapping areas with the left and right stop areas Alst and Arst set in step S26B are excluded. The left deceleration area Aldc is set to the left side of the driving lane width WLINE with the width of the initial widening amount Wi0. In contrast, the right deceleration area Ardc is set at a position moved from the right side of the driving lane width WLINE by the first widening amount Wi1, with the width of the difference (Wi2−Wi1). Note that the left and right stop areas Alst and Arst and the left and right deceleration areas Aldc and Ardc form the after-entering-intersection left/right-turn object detection area AOB2'.

By the way, as illustrated in FIG. 14B, in the case where the vehicle M is about to turn left from the intersection, in response to detection of an object OB moving on the pedestrian crossing ahead of the left turn, because the object OB is detected first in the left and right deceleration areas Aldc and Ardc, the autonomous driving control unit 22 is able to execute deceleration control at an early stage.

Meanwhile, as illustrated in FIG. 14B, in the case where a target object (pedestrian, bicycle, etc.) OB moving on the pedestrian crossing is detected in the left and right stop areas Alst and Arst set in the driving lane ahead of the left turn, the autonomous driving control unit 22 executes stop control.

Regarding the object detection area AOB2' set after entering the intersection, when the vehicle M completes the left or right turn and the direction of the vehicle M matches the target course set ahead of the left or right turn, in the later-described driving control routine, the object detection area AOB is switched from the left/right-turn object detection area AOB2' to the other-than-left/right-turn object detection area AOB1.

Therefore, the left/right-turn object detection area AOB2 is set only for a period from when an intersection is detected a certain distance (Lm+α) ahead of the vehicle M to when the vehicle M enters the intersection, as will be described later. When the vehicle M enters the intersection, the left/right-turn object detection area AOB2' is set until the vehicle M completes the left or right turn.

Figure 15B:
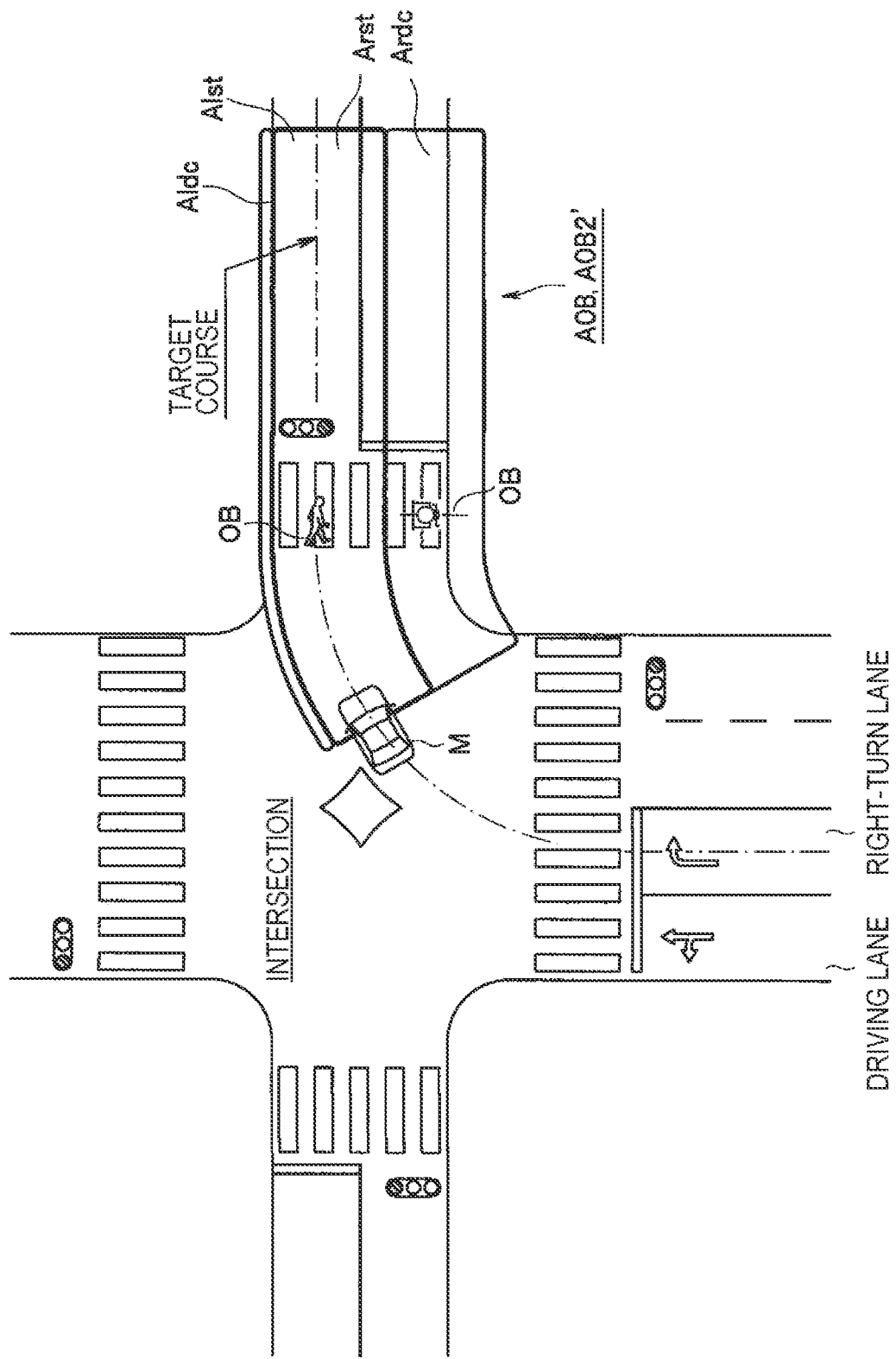
FIG. 15B is a bird's-eye view of an object detection area set after entering the intersection when turning right.

Meanwhile, when the left/right-turn object detection areas AOB2 and AOB2' are set when the vehicle M turns right at an intersection, as illustrated in FIGS. 15A and 15B, a target object (pedestrian) OB who is about to cross the pedestrian crossing from the sidewalk on the driving lane side ahead of the right turn is first detected in the left deceleration area Aldc, and deceleration control is executed. Next, the target object (pedestrian) OB is detected in the left stop area Alst, and stop control is executed. In contrast, in the case where a target object (bicycle) OB is about to cross the pedestrian crossing ahead of the right turn from the sidewalk on the opposite lane side, the target object (bicycle) OB is first detected in the right deceleration area Ardc, and deceleration control is executed. Next, the target object (bicycle) OB is detected in the right stop area Arst, and stop control is executed.

Therefore, in the case where the autonomous driving control unit 22 detects a target object OB who or which is about to cross the pedestrian crossing ahead of the right turn, deceleration control is executed first, and then stop control is executed. This does not make the driver, who is aware of the target object OB, feel anxiety that deceleration control may not be started. Similarly, the target object (pedestrian or bicycle) OB crossing the pedestrian crossing also recognizes the deceleration of the vehicle M, and therefore may feel safe.

The other-than-left/right-turn object detection area AOB1 and the left/right-turn object detection areas AOB2 and AOB2' set by the object detection area setter 22a described above are read by the driving control arithmetic unit 22b.

In the case where the vehicle M turns left or right at an intersection, the driving control arithmetic unit 22b reads the left/right-turn object detection area AOB2 before entering the intersection, and reads the left/right-turn object detection area AOB2' after entering the intersection. In other cases, the other-than-left/right-turn object detection area AOB1 is read. The driving control arithmetic unit 22b executes driving control in the case where a target object OB is detected in the read object detection area AOB1, AOB2, or AOB2'.

Figure 4:
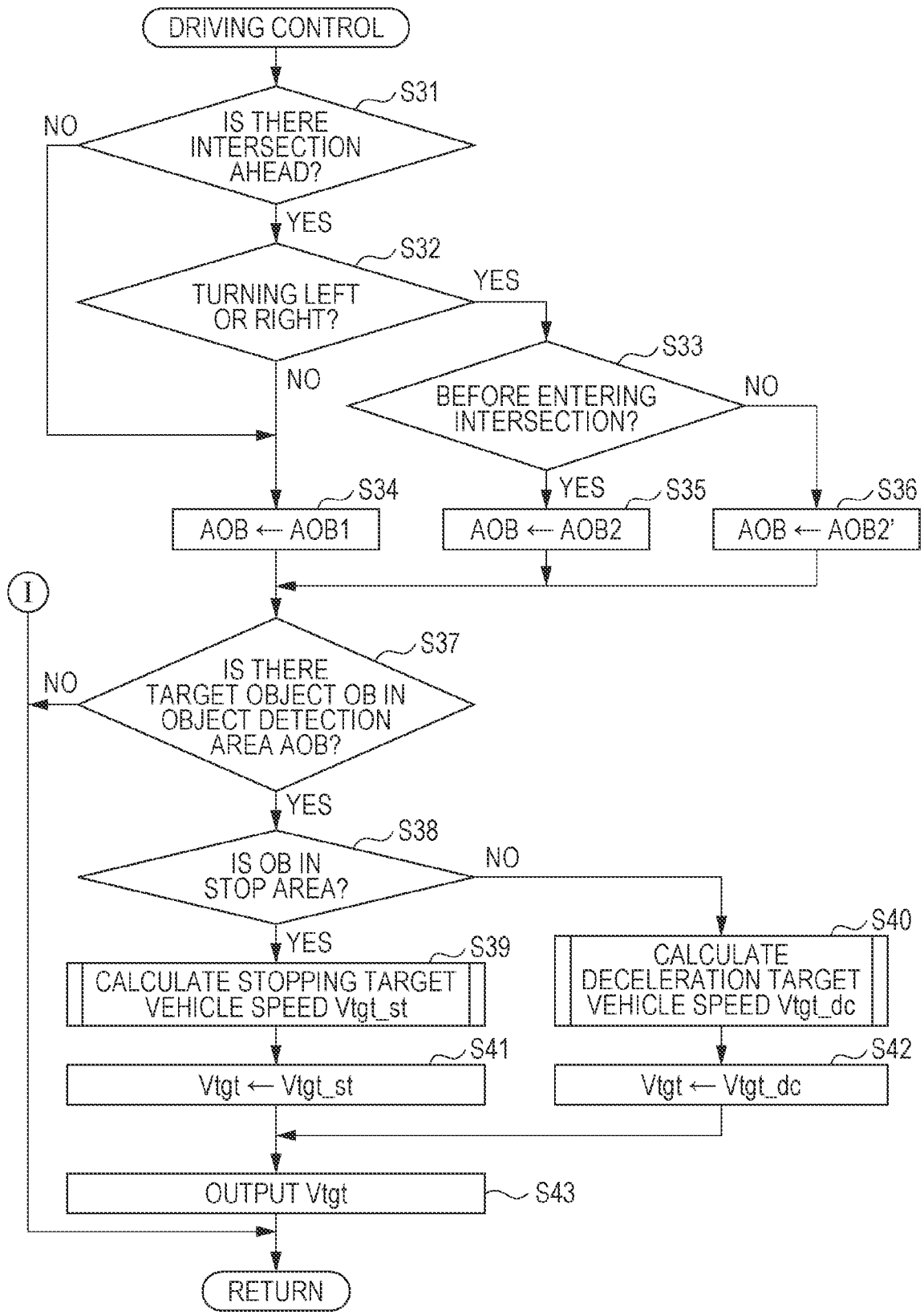
FIG. 4 is a flowchart illustrating a driving control routine.

Driving control of the vehicle M executed by the driving control arithmetic unit 22b is performed in accordance with, for example, the driving control routine illustrated in FIG. 4. In this routine, firstly in step S31, it is checked whether an intersection is detected in a section (Lm+a) obtained by further adding a preceding length a of about a few meters to a few tens of meters to the above-mentioned course length Lm of the target course set by the target course setting arithmetic unit 12c of the map locator arithmetic unit 12. Whether an intersection is detected is obtained on the basis of the driving environment ahead, which is recognized by the preceding driving environment recognizer 21d of the camera unit 21. Alternatively, because an intersection is static information on the road map, it may be detected from road map information obtained by the road map information obtaining unit 12b.

For example, as illustrated in FIG. 12, in the case where the target course is set on a straight road and no intersection is detected in a section obtained by adding the preceding length of about a few meters to a few tens of meters to the course length Lm, the routine jumps to step S34. Meanwhile, in the case where an intersection is detected, the routine proceeds to step S32.

In step S32, it is checked whether the target course set by the target course setting arithmetic unit 12c is in the direction of turning left or right at the intersection detected in step S31. In the case where the target course is set to the direction of driving straight at the intersection, the routine proceeds to step S34. Meanwhile, in the case where the target course is set to the direction of turning left or right at the intersection, the routine branches to step S33.

When the routine proceeds to step S34 from step S31 or step S32, the object detection area AOB is set to the other-than-left/right-turn object detection area AOB1 set by the routine for setting an object detection area when not turning left or right, which is illustrated in FIG. 2, and the routine proceeds to step S37 (AOB←AOB1).

Meanwhile, when the routine branches to step S33, whether the vehicle M is just before the intersection, that is, before entering the intersection, or after entering the intersection is checked on the basis of the driving environment ahead, which is recognized by the preceding driving environment recognizer 21d of the camera unit 21. Alternatively, this is detected by mapping the vehicle position to the road map information obtained by the road map information obtaining unit 12b.

In the case where it is determined that the vehicle M is driving just before the intersection, the routine branches to step S35. Meanwhile, in the case where it is determined that the vehicle M is entering the intersection, the routine branches to step S36.

When the routine proceeds to step S35, the object detection area AOB is set to the left/right-turn object detection area AOB2 set by the routine for setting an object detection area before entering an intersection, which is illustrated in FIG. 3A, and the routine proceeds to step S37 (AOB←AOB2).

In contrast, when the routine branches to step S36, the object detection area AOB is set to the left/right-turn object detection area AOB2' set by the routine for setting an object detection area after entering an intersection, which is illustrated in FIG. 3B, and the routine proceeds to step S37 (AOB←AOB2').

When the routine proceeds to step S37 from any of steps S34 to S36, it is determined whether a target object (pedestrian or bicycle) OB is detected in the object detection area AOB on the basis of the driving environment ahead, which is recognized by the preceding driving environment recognizer 21d of the camera unit 21. In the case where a target object OB is detected, the routine proceeds to step S38. Meanwhile, in the case where no target object OB is detected, the routine is exited.

When the routine proceeds to step S38, it is determined whether the target object OB is detected in at least one of the left or right stop area Alst or Arst. When it is determined that the target object OB is detected in at least one of the stop area Alst or Arst, the routine proceeds to step S39, and a stopping target vehicle speed Vtgt_st is calculated. Meanwhile, when it is determined in step S38 that the target object OB is detected in none of the left and right stop areas Alst and Arst, it is determined that the target object OB is in the deceleration area Aldc or Ardc, and that the vehicle M may pass without stopping by driving at a slower speed. The routine branches to step S40, and a deceleration target vehicle speed Vtgt_dc is calculated.

Figure 5:
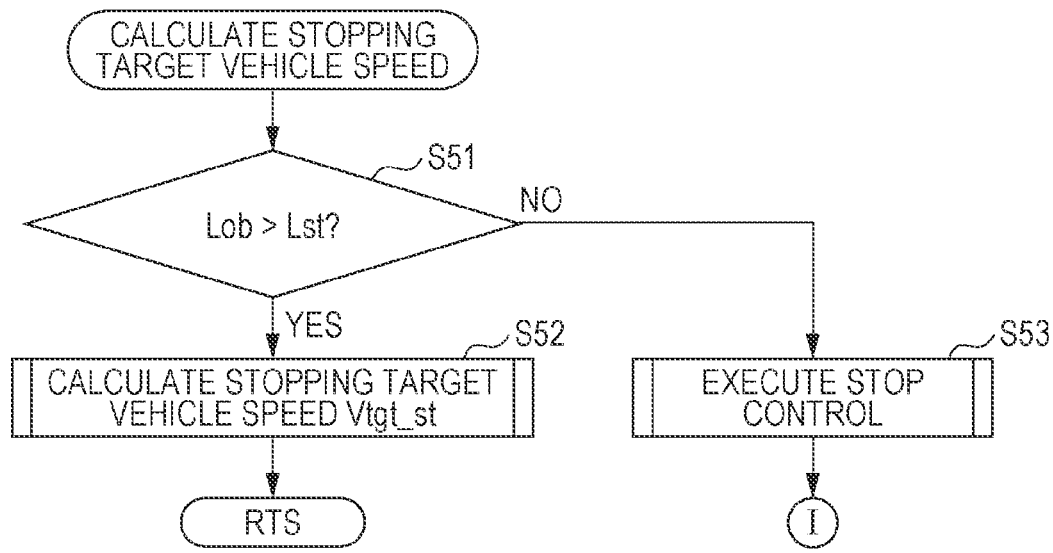
FIG. 5 is a flowchart illustrating a sub-routine for calculating a stopping target vehicle speed.

The stopping target vehicle speed Vtgt_st calculated in step S39 described above is obtained by a sub-routine for calculating a stopping target vehicle speed, which is illustrated in FIG. 5. In this sub-routine, firstly in step S51, it is checked whether a distance (object-to-object distance) Lob (note that Lob≤Lm) to the target object OB ahead of the vehicle M, which is recognized by the above-described preceding driving environment recognizer 21d, is longer than a preset stop distance Lst (2 to 3 [m]). When it is determined that the object-to-object distance Lob is longer than the stop distance Lst (Lob<Lst), the routine proceeds to step S52. In contrast, when it is determined in step S51 that the object-to-object distance Lob is less than or equal to the stop distance Lst (Lob≤Lst), the routine branches to step S53, emergency stop processing of the related art for suddenly stopping the vehicle M is executed, and the routine is exited.

Meanwhile, when the routine proceeds to step S52, the stopping target vehicle speed Vtgt_st is calculated on the basis of the following equation (1), and the routine proceeds to step S41 in FIG. 4:

$$Vtgt\_st = \sqrt{2 \cdot g \cdot Gtgt \cdot (Lob - Lst) + V0^2} \qquad (1)$$

where g: gravitational acceleration [m/S$^2$], Gtgt: target deceleration rate (negative acceleration rate) [%], and V0: current vehicle speed (initial speed) [km/h]. This equation (1) is for obtaining the stopping target vehicle speed Vtgt_st at which the current vehicle speed V0 becomes 0 [km/h] when the vehicle M moves by (Lob−Lst) from the current vehicle speed V0 for each arithmetic period. Although the target deceleration rate Gtgt may be any fixed value that may be set in any manner, the target deceleration rate Gtgt may be a variable value set on the basis of the vehicle speed V0.

Note that (g·Gtgt) is the required deceleration (negative acceleration), and, when expressed using a=g·Gtgt, if Vtgt_st is V and (Lob−Lst) is driving distance x, the above-mentioned equation (1) becomes the general formula 2ax=V$^2$−V0$^2$.

When the routine proceeds to step S41 in FIG. 4, the target vehicle speed Vtgt is set with the stopping target vehicle speed Vtgt_st calculated in step S52 described above (Vtgt←Vtgt_st), and the routine proceeds to step S43. Note that the processing in steps S39 and S41 corresponds to a stop controller of the disclosure.

Meanwhile, when the routine branches from step S38 to step S40, the deceleration target vehicle speed Vtgt_dc for allowing the vehicle M to pass near the target object OB without stopping is calculated.

Figure 6:
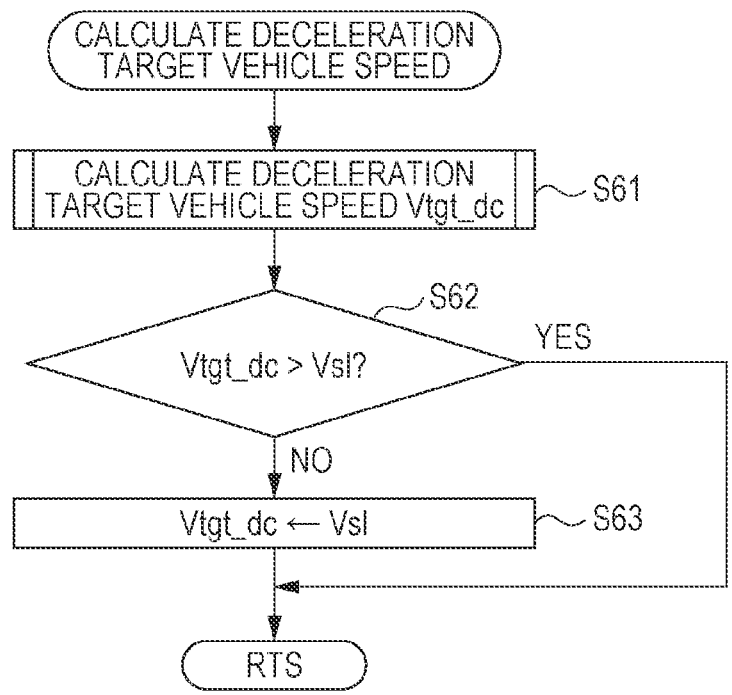
FIG. 6 is a flowchart illustrating a sub-routine for calculating a deceleration target vehicle speed.

The deceleration target vehicle speed Vtgt_dc is obtained by a sub-routine for calculating a deceleration target vehicle speed, which is illustrated in FIG. 6. In this sub-routine, firstly in step S61, the deceleration target vehicle speed Vtgt_dc is calculated using the following equation (2):

$$Vtgt\_dc = V\alpha - Vsub \qquad (2)$$

where Vα is a static set vehicle speed set for each course, which is a speed limit specified for the road if the road is a straight road, or is a preset passing speed (such as 20 [km/h]) if the vehicle M turns left or right at the intersection. In addition, Vsub is a deceleration amount for allowing the vehicle M to pass safely near the target object OB, which may be a fixed value such as 10 [Km/h], or may be a variable value set for each set vehicle speed Va.

Next, the routine proceeds to step S62, and the deceleration target vehicle speed Vtgt_dc and a slower speed Vsl are compared. The slower speed Vsl is a lower limiter value at which the vehicle M may safely pass by the side of the target object OB, and is a preset fixed value such as 5 to 10 [km/h].

In the case where Vtgt_dc>Vsl, the routine proceeds to step S42 in FIG. 4 as it is. In contrast, in the case where Vtgt_dc≤Vsl, the routine proceeds to step S63, the deceleration target vehicle speed Vtgt_dc is set with the slower speed (Vtgt_dc←Vsl), and the routine proceeds to step S42 in FIG. 4. In step S42 in FIG. 4, the target vehicle speed Vtgt is set with the deceleration target vehicle speed Vtgt_dc calculated in step S63 mentioned above (Vtgt←Vtgt_dc), and the routine proceeds to step S43. Note that the processing in steps S40 and S42 corresponds to a deceleration controller of the disclosure.

When the routine proceeds to step S43, the target vehicle speed Vtgt set in step S41 or step S42 is output, and the routine is exited.

The driving control arithmetic unit 22b compares the vehicle speed detected by the vehicle speed sensor provided as part of the vehicle state sensor 16 and the target vehicle speed Vtgt obtained by the driving control routine, and outputs a brake signal for the acceleration/deceleration controller 33 so that the vehicle speed will be within the target vehicle speed Vtgt, thereby controlling the output of the drive sources (engines, motors, etc.). Meanwhile, in the case where it is determined that it is difficult to decelerate the vehicle speed to the target vehicle speed Vtgt even by controlling the output of the drive sources, a brake signal is output to the brake controller 32 to forcedly activate the brake, thereby decelerating the vehicle speed to the target vehicle speed Vtgt.

In this manner, according to the present embodiment, the stop areas Alst and Arst are set ahead of the vehicle M to the left and right of the center of the driving lane on the basis of the driving lane width WLINE, and the deceleration areas Aldc and Ardc are set on both sides thereof. Accordingly, when the vehicle M is turning left or right at the intersection, in the case where a target object OB such as a pedestrian or a bicycle is detected in the stop area Alst or Arst on the pedestrian crossing ahead of the left or right turn, the vehicle M automatically stops. Meanwhile, in the case where a target object OB is detected in the deceleration area Aldc or Ardc, the vehicle M may pass near the target object OB at a safe speed. As a result, the vehicle speed of the vehicle M may be appropriately controlled, and the driver's feeling of anxiety or uncomfortableness may be reduced.

Furthermore, regarding the stop areas Alst and Arst set when turning left or right, the stop width Wrst of the right stop area Arst after entering the intersection is set wider than the left-side stop width Wlst before entering the intersection. Accordingly, a target object OB crossing the pedestrian crossing from right to left is detected at an early stage, and stop control is executed. This may give a sense of safety to the target object OB.

In the present embodiment, regarding the deceleration areas Aldc and Ardc set when turning left or right, the right-side deceleration width Wrdc of the right deceleration area Ardc is set wider than the left-side deceleration width Wldc of the left deceleration area Aldc. Therefore, upon the left turn, even if a target object OB is moving from right to left on the pedestrian crossing, that is, approaching to be closer to the vehicle M, immediately before the direction of the vehicle M becomes gradually directed to the lane ahead of the left turn, the target object OB is quickly detected in the right deceleration area Ardc, and deceleration control is executed at an early stage. This may give a sense of safety to both the occupant(s) of the vehicle M and to the target object OB. In addition, because the vehicle M turns right upon the right turn, deceleration control is executed by quickly detecting, in the right deceleration area Ardc, a target object OB who or which is about to cross the pedestrian crossing ahead of the right turn. This may give a sense of safety to the target object OB who or which is crossing the pedestrian crossing.

Note that the driving assistance apparatus of the disclosure is not limited to the case of application to the above-mentioned autonomous driving function, and is applicable as the function of an advanced emergency braking system (AEBS).

The driving assistance apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assistance apparatus 1 including the preceding driving environment recognizer 21d, the object detection area setter 22a, and the driving control arithmetic unit 22b. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assistance apparatus to be applied to a vehicle, the driving assistance apparatus comprising:
   a camera configured to obtain driving environment information on a driving environment ahead of the vehicle;
   a target object recognizer configured to recognize a target object based on the driving environment information obtained by the camera;
   an object detection area setter configured to set, ahead of the vehicle, an object detection area for detecting the target object recognized by the target object recognizer, wherein the object detection area setter comprises
     a stop area setter configured to set a stop area ahead of the vehicle, and
     a deceleration area setter configured to set a left deceleration area and a right deceleration area respectively to left and right of the stop area; and
   a driving control arithmetic unit configured to control a driving state of the vehicle in a case where the target object is detected in the object detection area, wherein the driving control arithmetic unit comprises
     a stop controller configured to control the vehicle to stop in a case where the target object recognized by the target object recognizer is detected in the stop area, and
     a deceleration controller configured to control the vehicle to decelerate in a case where the target object recognized by the target object recognizer is detected in at least one of the left deceleration area and the right deceleration area,
   wherein a width of the left deceleration area and a width of the right deceleration area are set so that the width of the right deceleration area is wider than the width of the left deceleration area on a left-hand traffic road, and the width of the left deceleration area is wider than the width of the right deceleration area on a right-hand traffic road.

2. The driving assistance apparatus according to claim 1, wherein the width of the left deceleration area and the width of the right deceleration area are set so that the width of the right deceleration area is wider than a lane width of a right adjacent lane on the left-hand traffic road, and the width of the left deceleration area is wider than a lane width of a left adjacent lane on the right-hand traffic road, the right adjacent lane being on a right side of and adjacent to a driving lane where the vehicle travels, the left adjacent lane being on a left side of and adjacent to the driving lane.

3. The driving assistance apparatus according to claim 2, wherein
a width of the stop area is set to a lane width of the driving lane, and
in a case where the vehicle is traveling in a direction of turning left or right, the stop area is widened to a right side from the driving lane on a left-hand traffic road, and the stop area is widened to a left side from the driving lane on a right-hand traffic road.

4. The driving assistance apparatus according to claim 3, wherein a width of the left deceleration area and a width the right deceleration area are set by a preset initial widening amount in a case where there is no adjacent lane on a side of each of the left deceleration area and the right deceleration area.

5. The driving assistance apparatus according to claim 2, wherein a width of the left deceleration area and a width the right deceleration area are set by a preset initial widening amount in a case where there is no adjacent lane on a side of each of the left deceleration area and the right deceleration area.

6. The driving assistance apparatus according to claim 1, wherein
a width of the stop area is set to a lane width of a driving lane where the vehicle travels, and
in a case where the vehicle is traveling in a direction of turning left or right, the stop area is widened to a right side from the driving lane on a left-hand traffic road, and the stop area is widened to a left side from the driving lane on a right-hand traffic road.

7. The driving assistance apparatus according to claim 6, wherein a width of the left deceleration area and a width the right deceleration area are set by a preset initial widening amount in a case where there is no adjacent lane on a side of each of the left deceleration area and the right deceleration area.

8. The driving assistance apparatus according to claim 1, wherein a width of the left deceleration area and a width the right deceleration area are set by a preset initial widening amount in a case where there is no adjacent lane on a side of each of the left deceleration area and the right deceleration area.

9. A driving assistance apparatus to be applied to a vehicle, the driving assistance apparatus comprising:
a camera configured to obtain driving environment information on a driving environment ahead of the vehicle;
a target object recognizer configured to recognize a target object based on the driving environment information obtained by the camera;
an object detection area setter configured to set, ahead of the vehicle, an object detection area for detecting the target object recognized by the target object recognizer, wherein the object detection area setter comprises
a stop area setter configured to set a stop area ahead of the vehicle, and
a deceleration area setter configured to set a left deceleration area and a right deceleration area respectively to left and right of the stop area; and
a driving control arithmetic unit configured to control a driving state of the vehicle in a case where the target object is detected in the object detection area, wherein the driving control arithmetic unit comprises
a stop controller configured to control the vehicle to stop in a case where the target object recognized by the target object recognizer is detected in the stop area, and
a deceleration controller configured to control the vehicle to decelerate in a case where the target object recognized by the target object recognizer is detected in at least one of the left deceleration area and the right deceleration area,
wherein a width of the stop area is set to a lane width of a driving lane where the vehicle travels, and
wherein in a case where the vehicle is traveling in a direction of turning left or right, the stop area is widened to a right side from the driving lane on a left-hand traffic road, and the stop area is widened to a left side from the driving lane on a right-hand traffic road.

10. The driving assistance apparatus according to claim 9, wherein a width of the left deceleration area and a width the right deceleration area are set by a preset initial widening amount in a case where there is no adjacent lane on a side of each of the left deceleration area and the right deceleration area.

11. A driving assistance apparatus to be applied to a vehicle, the driving assistance apparatus comprising:
circuitry configured to
recognize a target object based on driving environment information on a driving environment ahead of the vehicle,
set an object detection area ahead of the vehicle for detecting the target object, and
control a driving state of the vehicle upon detecting the target object in the object detection area,
set a stop area ahead of the vehicle and set a left deceleration area and a right deceleration area respectively to left and right of the stop area,
control the vehicle to stop upon detecting the target object in the stop area, and
control the vehicle to decelerate upon detecting the target object in at least one of the left deceleration area and the right deceleration area,
wherein a width of the left deceleration area and a width of the right deceleration area are set so that the width of the right deceleration area is wider than the width of the left deceleration area on a left-hand traffic road, and the width of the left deceleration area is wider than the width of the right deceleration area on a right-hand traffic road.

12. A driving assistance apparatus according claim 11, wherein a width of the stop area is set to a lane width of a driving lane where the vehicle travels, and
wherein in a case where the vehicle is traveling in a direction of turning left or right, the stop area is widened to a right side from the driving lane on a left-hand traffic road, and the stop area is widened to a left side from the driving lane on a right-hand traffic road.

\* \* \* \* \*